INVENTOR.
Richard F. Harrington
BY
Olson, Trexler, Wolters & Bushnell
attys

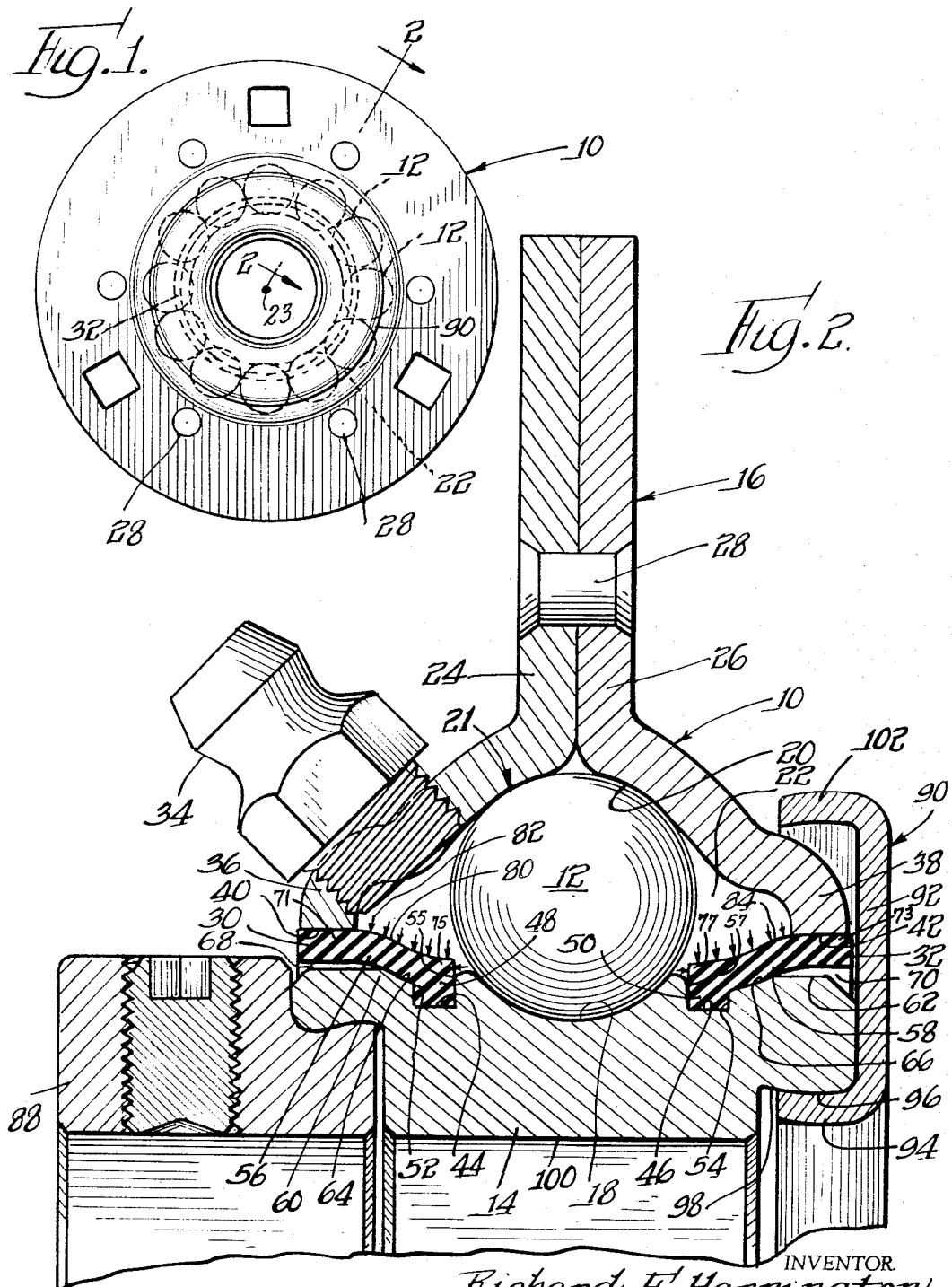

United States Patent Office 3,346,307
Patented Oct. 10, 1967

3,346,307
SEALED BEARING
Richard F. Harrington, Lincolnwood, Ill., assignor, by mesne assignments, to Textron Inc., Providence, R.I., a corporation of Rhode Island
Continuation of application Ser. No. 456,461, May 17, 1965, which is a continuation of application Ser. No. 272,892, Apr. 15, 1963. This application Feb. 28, 1966, Ser. No. 534,579
6 Claims. (Cl. 308—187.1)

ABSTRACT OF THE DISCLOSURE

A sealed bearing in which an outer bearing element journalled in encircling relation to an inner bearing element is sealed to the latter by an annular seal of yieldable polymeric material having a marginal edge cantilevering in an axially extending direction and urged outwardly into slidable sealing engagement with an encircling sealing surface on the outer bearing element by residual stress in the seal. Radial clearance on the inner side of the seal extends axially inward of the engagement of the seal with the encircling sealing surface and a laterally projecting seal lip extends into an inner bearing element groove located axially inward of the mutual engagement of the seal and sealing surface so that internal fluid pressure acts on the seal to simultaneously release excess fluid and tighten the retention of the lip in the groove. Reliable bearing sealing is achieved under severe conditions including high operating speeds and the environmental exposure of bearings on agricultural machinery, for example.

Summary of Invention

The present application is a continuation of applicant's copending application Ser. No. 456,461, filed May 17, 1965, which copending application is a continuation of applicant's application Ser. No. 272,892, filed Apr. 15, 1963.

The present invention relates to bearings and is concerned with the sealing of bearings which are charged internally with lubricant under pressure and bearings which are used under adverse environmental conditions in which stringly materials may be wrapped and dragged in adjacent concentric relation to a bearing.

Although the invention is not necessarily limited to the sealing of antifriction bearings, it is particularly applicable to antifriction bearings to effect sealing of the annular bearing space between two race members within which space an annular series of rotary load bearing elements orbit in rolling contact with two races formed by the two race members. The provision in such bearings of sealing means capable not only of retaining lubricant in the bearing spaces but also of excluding contaminants from the bearing spaces is particularly important when the bearings are used in agricultural machinery and in other adverse environments.

As a practical matter, a bearing intended for use in agricultural machinery and the like should not only be sealed against the loss of essential lubricant and against the entry of foreign materials into critical bearing spaces, but the bearing, including its sealing structure, should be suited for economical manufacture.

Increases in the cost of manufacturing a bearing, due to the cost of the structure used to seal the bearing, diminishes in a very practical sense the over-all advantages of the bearing.

A most practical sealed bearing of the prior art is disclosed in applicant's United States Patent No. 2,823,-967, issued Feb. 18, 1958. Bearings of this type are used frequently in environments in which foliage or other stringy materials are wrapped and dragged in close relation to the bearing sealing structure. Such materials when dragged along in concentric relation to a bearing can have a tendency to interfere with sealing of the bearing. Other adverse influences to which such bearings are subjected include the injection of excessive lubricant under high pressure into sealed spaces within a bearing.

One object of the invention is to provide an improved sealed bearing.

Another object is to provide a bearing in which internal bearing space is effectively sealed against the escape of a working supply of lubricant and against the intrusion of foreign materials, by means of an improved and most economical as well as practical construction of the bearing which automatically releases excessive lubricant from the internal bearing space to protect the bearing and sealing structure from damage by the buildup of internal pressure, and which is not vulnerable to damage by stringy materials, such as foliage, that may become wrapped in concentric adjacent relation to the bearing in service.

Another object is to provide an improved bearing in which the bearing space is sealed along each side by simple structure consisting of two race elements of the bearing and a simple polymeric, annular seal element which are so related to each other that the seal is effectively protected against dislodgement from a useful sealing position by high fluid pressure within the bearing, or by strands of material which may become wrapped adjacent the race elements as an incident to rotation of the race elements in relation to each other.

Another object is to provide a radial load supporting bearing in which an internal bearing space is effectively sealed along each side by means of a resilient polymeric seal element which forms a highly advantageous bearing seal and serves, by virtue of an improved construction of the bearing and sealing structure, to use the resiliency of the polymeric seal to advantage in retaining the seal in a desired working position against forces which may tend to dislodge the seal from its working position.

Another object is to provide a bearing which is effectively sealed along one annular side by extremely simple bearing and seal structure which is so designed that excessive fluid pressure within internal bearing space tends to increase the forces which work to retain the seal in its effective working position.

Another object is to provide an improved sealed bearing of the character recited in the preceding objects which is inherently well suited for economy of manufacture and ease of assembly.

Another object is to provide a sealed bearing as recited in the preceding objects in which the bearing sealing structure is further protected from the external environment by an external annular shield secured to one of two race elements in a manner which assures a concentric relationship of the shield to the bearing and a most powerful mechanical attachment of the shield to the race element to which it is secured, while at the same time providing for very economical manufacture of the bearing.

Other objects and advantages will become apparent from the following description of the invention, taken with reference to the drawings, in which:

FIG. 1 is an end view of a bearing constructed in accordance with the invention;

FIG. 2 is a fragmentary axial sectional view of the bearing on a greatly enlarged scale, taken with reference to the line 2—2 of FIG. 1;

Figure 5:
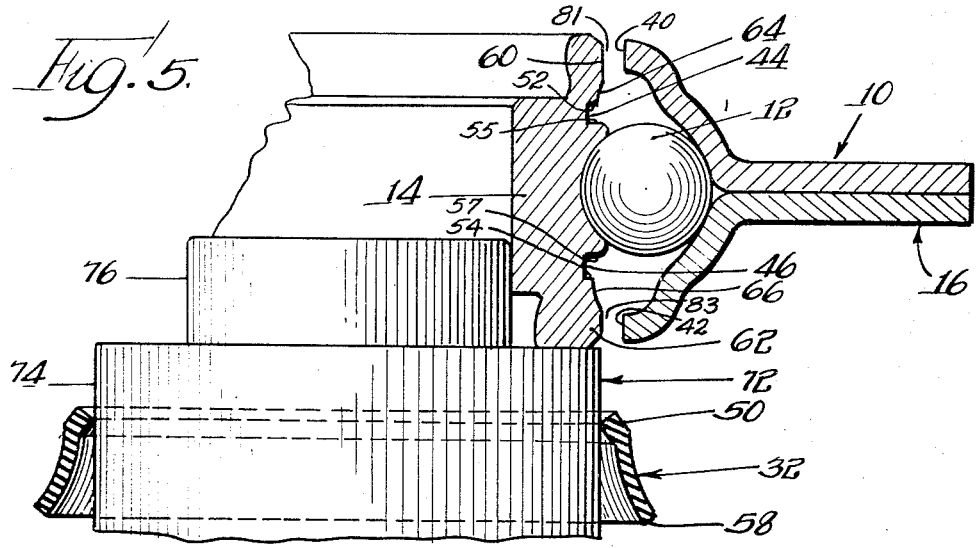
FIG. 5 is a partially sectioned side view illustrating the assembling of an annular seal element into the bearing.

Referring to the drawings in greater detail, the antifriction bearing 10 forming the exemplary embodiment of the invention illustrated in FIGS. 1 and 2, comprises an annular series of bearing balls 12 disposed between an inner race or bearing element 14 of annular form and an outer race or bearing element 16 of annular form in rolling engagement with both an inner bearing race 18 formed on the inner race or bearing element 14 and an outer race 20 formed on the outer race or bearing element 16 in encircling relation to the inner race 18. Upon rotation of the inner and outer bearing elements 14, 16 in relation to each other, the bearing balls 12 constitute rotary load bearing members which orbit within an annular bearing space 22 located between the inner race element 14 and the encircling race element 16. In this manner, the balls 12 in rolling engagement with the races 18, 20 form journal means 21 which mutually journals the inner and outer bearing elements 14, 16 for relative rotation about a common axis 23, FIG. 1.

In the construction illustrated, the outer annular race element 16 is formed in two half-sections 24, 26 shaped as mirror images of each other and secured together by rivets 28. Preferably, the two half sections 24, 26 of the outer race element 16 are fashioned from sheet metal stock.

Effective sealing of the bearing space 22 within which the antifriction bearing elements 12 orbit is achieved in the construction illustrated by the structure of the inner race element 14 and the outer race element 16 aided only by two annular seals 30, 32 formed of resilient polymeric material and located on opposite sides of the series of bearing balls 12.

Lubricant under pressure is injected into the bearing space 22 in the bearing 10 through a self-sealing lubricating fitting 34, of conventional design, which is threaded into the half section 24 of the outer race element 16, as illustrated in FIG. 2. The lubricating fitting 34 provides for great ease and convenience in lubricating and in relubricating the bearing 10 after it has been placed in service.

Aside from the convenience of lubrication provided by the fitting 34, it is necessary to take into account that the bearing 10 may be subjected to lubricating operations which tend to inject lubricant into the bearing space 22 in excess of the volumetric capacity of the space 22, with a consequent tendency to build up internal pressure within the space 22 which tends to act on the structure relied on to seal the space 22 from the external environment.

Each of the annular seals 30, 32 and the inner race element 14 are so designed in relation to each other that each seal 30, 32 responds to a buildup of excessive pressure within the bearing space 22 to automatically release lubricant from the space 22 only to the extent necessary to relieve the pressure within the space 22, while at the same time utilizing the pressure within the space 22 to strengthen the action by which each seal 30, 32 is held in its normal position on the inner race element 14 against any forces which would tend to dislodge the seal from its normal effective position with reference to the inner race element.

Moreover, the physical relationship of each seal 30, 32 to the inner race element 14 provides not only for the utilization of internal pressure within the space 22 to increase the retention of the seal againest dislodgement, while at the same time providing for automatic release of excessive pressure within the space 22, but also provides for highly efficient and economical asembly of each seal into the bearing by simple movement of the seal axially in relation to the inner race element into the normal assembled position of the seal, where the seal is anchored securely and effectively against dislodgement by the coaction of the seal with the inner race element alone.

Having reference to the preferred construction illustrated, the inner peripheral portions 36, 38 of the two half sections 24, 26 of the outer annular race element 16 are shaped inwardly of the race 20 to diverge away from the annular series of bearing balls 12, and to define respectively two annular sealing surfaces 40, 42 of substantially cylindrical shape and located with respect to the axis of the bearing substantial distances axially outward from the balls 12. The bearing space 22 is sealed along its opposite circumferential sides by slidable, sealing engagement with the respective surfaces 40, 42 of the two seals 30, 32 respectively.

The seals 30, 32 are fashioned and anchored to the inner bearing element 14 in relation to the location of the sealing surfaces 40, 42 so that the action of internal pressure in the space 22 on each seal 30, 32 is essentially to intensify the force with which the seal is held against dislodgement from its effective asembled position, while at the same time minimizing the subjection of the seal to pressure force tending to dislodge the seal from its effective sealing position within the bearing.

Thus, in the preferred construction illustrated, the inner race element 14 is shaped to define two annular grooves 44, 46 which open radially outward in positions along the axis of the bearing which are located substantial distances axially inward of the respective sealing surfaces 40, 42. Preferably, both grooves 44, 46 are located very near the opposite annular edges of the inner race 18.

The two grooves 44, 46 are dimensioned to receive two anchoring lips 48, 50 formed as integral components of the respective annular seals 30, 32. As shown in FIG. 2, each of the lips 48, 50 has a rectilinear shape in cross section and fits into the corresponding one of the grooves 44, 46 which has a complementary shape. The axially outward limits of the two grooves 44, 46 are defined respectively by two annular abutments 52, 54 integral with the inner race element 14. Each of the annular abutments 52, 54, sometimes referred to as "radial shoulders," extends radially outward in concentric relation to the bearing axis 23 and faces axially toward the journal means 21 at a steep angle to the bearing axis 23. As shown, the groove 44 is defined by two radial and generally parallel groove walls, the outermost one of which is formed by the annular abutment 52 and the other of which is identified by the number 55 in FIGS. 2 and 5. Similarly, the groove 46 is defined by two radial and generally parallel groove walls, the outermost one of which is formed by the annular abutment 54 and the other of which is identified by the number 57 in FIGS. 2 and 5. As will presently appear, the two annular abutments 52, 54 integral with the inner race element 14 coact with the two anchoring lips 48, 50 to positively anchor the respective annular seals 30, 32 against dislodgement by forces which may tend to pull the seals axially from the bearing.

The positional relationship of the annular abutments or shoulders 52, 54 to the sealing surfaces 40, 42 is such that the minimum radial spacing between the shoulders 52, 54 and the sealing surfaces 40, 42 is restricted in relation to the minimum axial spacing between the shoulders 52, 54 and the respective sealing surfaces 40, 42. In the preferred construction illustrated, the minimum radial spacings between the outermost groove walls or abutments 52, 54 and the respective sealing surfaces 40, 42 do not exceed the minimum axial spacings of the outermost groove walls or abutments 52, 54 from the adjacent sealing surfaces 40, 42. Put another way, the outermost groove wall 52 of the groove 44 is spaced axially inward from the sealing surface 40 by an axial distance that is at least equal to the spacing, measured in a radial direction, of the outer periphery of the outermost groove wall 52 from the inner edge of the sealing surface 40. Similarly, the outermost groove wall 54 of the groove 46 is spaced axially inward from the sealing surface 42 by an axial distance that is at least equal to the spacing, measured in a radial direction, of the outer periphery of the groove wall 54 from the inner edge of the sealing surface 42.

As previously intimated, the two seals 30, 32 are formed of a yieldable polymeric material which has physical memory by which the material after being subjected to deformation tends to return to its undeformed shape. Thus, the seals can be formed of a resilient elastomeric material such, for example as synthetic rubber.

In addition to the two anchoring lips 48, 50, the two seals 30, 32 comprise two flexible bridging elements 56, 58 integral with the respective anchoring lips 48, 50, and extending from the anchoring lips 48, 50 axially outward into sliding engagement with the respective sealing surfaces 40, 42. The thickness of each bridging element 56, 58 is only a fraction of the width of the bridging element.

In the preferred construction illustrated, annular portions 60, 62 of the inner race element 14 extend axially beyond the respective grooves 44, 46 and have maximum outer diameters somewhat exceeding the maximum diameters of the respective groove shoulders 52, 54. Preferably, these portions 60, 62 of the inner annular race element 14 are shaped, as shown, to define annular surfaces 64, 66 sloping from the shoulders 52, 54 in radially outward directions axially away from the grooves 44, 46 to provide additional support to portions of the annular bridging elements 56, 58 adjacent the grooves 44, 46.

The overall diameter of the axially extending portions 60, 62 of the inner race element are restricted to provide, between the annular portions or segments 60, 62 and the encircling surfaces 40, 42, radial spacings which exceed the thicknesses of the outer marginal edge portions of the bridging elements 56, 58 which slidably engage the respective sealing surfaces 40, 42. This provides inwardly of the outer marginal edges of the seal bridging elements 56, 58 radial clearance spaces 68, 70 which allow the bridging elements 56, 58 to swing away from the sealing surfaces 40, 42 when the space 22 is subjected to excessive internal pressure, as will presently appear.

From FIG. 2 and the foregoing description, it will be evident that the axially outward portions of the seal bridging elements 56, 58 cantilever from the inner race element 14 into sliding engagement with the respective surfaces 40, 42. The initial shaping of the seals 30, 32 and the physical memory of the material from which the seals are formed is such that the cantilevering portions of the seals are continuously urged into close sealing engagement with the surfaces 40, 42. Thus, as shown, the seals 30, 32 slidably engage the respective sealing surfaces 40, 42 along annular bands of mutual engagement of the seals and sealing surfaces having substantial width. In the construction illustrated, the bands along which the seals 30, 32 are engaged mutually with the respective sealing surfaces 40, 42 are coextensive with the respective surfaces 40, 42 illustrated and, for clarity and convenience, are identified by the same reference numbers "40, 42." Having reference again to the radial clearance spaces 68, 70 previously mentioned, it will be seen with reference to FIG. 2 that the clearance spaces 68, 70 disposed on the radially inward sides of the seals 30, 32 have axial extends which run axially entirely across said respective bands 40, 42 of mutual engagement and which extend substantial distances axially from said respective bands of mutual engagement toward said grooves 44, 46. The radial clearance spaces 68, 70 are annular in form and provide for radially inward movement of the cantilevering portions of the bridging elements 56, 58 in response to elevated fluid pressure within the internal space 22. For convenience, the cantilevering annular portions of the seals 30, 32, which encircle the respective clearance spaces 68, 70, are identified in FIG. 2 by the reference numbers "71, 73." The annular portions of the seals 30, 32 located inwardly of the cantilevering seal portions 71, 73 include the seal lips 48, 50 and serve to support the cantilevering annular portions 71, 73 of the respective seals. The annular support portions of the seals 30, 32, which engage the inner bearing element 14 and support the respective cantilevering seal portions 71, 73, are identified in FIG. 2 by the numbers "75, 77." As shown in FIG. 2 the annular seal anchoring lips 48, 50 constituting components of the annular support portions 75, 77 of the respective seals 30, 32 project laterally sharply in relation to the adjacent portions of the annular cantilevering portions 71, 73 of the respective seals.

Figure 6:
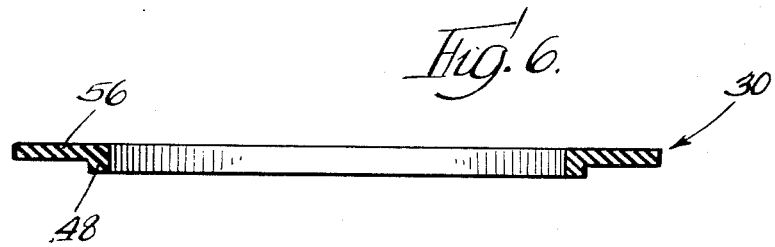
FIG. 6 is a transverse sectional view of the seal element, taken with reference to the line 6—6 of FIG. 3, but showing the seal element on the same scale as FIG. 5 to illustrate the dimensional relationship to the bearing of the seal element as formed.
Figure 3:
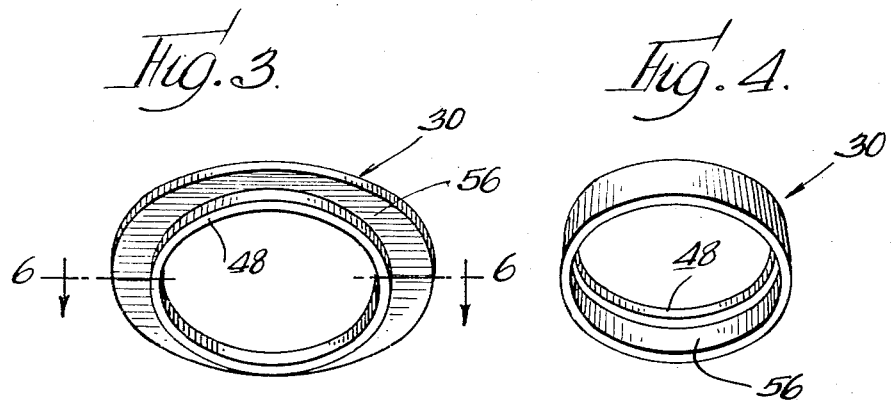
FIG. 3 is a perspective view showing an individual seal element in the form in which it is initially produced.

The seal 30, which is typical of both of the seals 30, 32, is initially formed to have the shape illustrated in FIGS. 3 and 6. As the seal 30 is initially formed, and before it is deformed by stress, the bridging element 56 of the seal is essentially flat and extends radially outward from the sealing lip 48 which itself has the shape of a hollow cylinder integral with the inner periphery of the bridging element 56 and projecting laterally in relation to the bridging element 56, as shown in FIG. 6.

Figure 4:
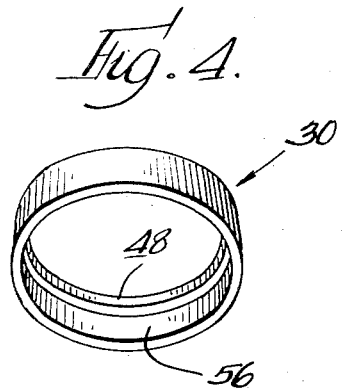
FIG. 4 is a perspective view showing the seal element of FIG. 3 after it has been rolled to the general form which the seal element has when assembled in the bearing.

In the course of being assembled into the bearing 10, the typical seal 30 is turned or rolled through an angle of approximately ninety degrees (with reference to an axial sectional view of the seal) so that the seal assumes the general shape illustrated in FIG. 4. Thus, the annular bridging element 56 is turned from its initially flat or coplanar shape so that it approaches a somewhat cylindrical shape and the anchoring lip 48, which initially has a generally cylindrical shape, is turned so that it extends radially inward from the bridging element 56.

Assembly of the bearing 10 is a rather simple matter. The inner race element 14, bearing balls 12 and outer race element 16 are assembled together in a conventional fashion, so that the bearing 10 has the partially completed form illustrated in the fragmentary axial sectional view of FIG. 5.

Each of the seals 30, 32 is assembled into the bearing by a simple, axial movement of each seal relative to the bearing performed with the aid of a very simple bearing support and seal guide element 72, illustrated in FIG. 5.

The assembly element 72 comprises a cylindrical body portion 74 having a diameter substantially equal to the outer diameter of each of the portions or segments 60, 62 of the inner race member 14 which extend axially beyond the grooves 44, 46. The body 74 supports an axially projecting boss 76 concentric with the cylindrical body 74 and dimensioned to fit into the inner race element 14, as illustrated in FIG. 5.

FIGURE 5 illustrates the manner in which the seal 32, for example, is assembled into the bearing 10. The seal 32, which in this instance is identical to the seal 30, is, after being formed as described, fitted around the cylindrical body 74 in the general fashion illustrated in FIG. 5. The partially completed bearing 10 is placed on the boss 76 adjacent the body 74 and the seal 32 is moved axially along the body 74 toward the balls 12, so that the anchoring lip 50 slides over the race element portion 62 and along the surface 66 down into the complementary groove 46 wherein the anchoring lip 50 is turned ninety degrees with reference to the cylindrical shape of the anchoring lip as it is initially formed. In this manner, the seals 30, 32 are assembled by movement of the seals in axially inward directions into annular seal accommodating spaces situated between the inner and outer bearing elements 14, 16 and identified respectively in FIG. 5 by the reference numbers "81, 83." Inward movements of the seals 30, 32 into the seal accommodating spaces 81, 83 to assemble the seals in the bearing, after the balls 12 and inner and outer bearing elements 14, 16 have been assembled together, are accommodated by virtue of the spaces 81, 83 opening axially outward and each of the spaces 81, 83 having, as evident from the drawings and the foregoing description of the seal assembly operation, a minimum radial dimension that exceeds the minimum lateral dimension of every portion of the corresponding seal.

The tendency which the radially extending anchoring lip 50, thus twisted from its initially cylindrical form, has to return to its initial form causes the assembled anchoring lip 50 to be urged against the adjacent walls 54, 57 of the groove 46 to form an effective seal between the assembled seal 32 and the inner race element 14. It will be observed with reference to FIGS. 2, 5 and 6 that the direction in which the anchoring lip 50 is twisted to produce residual stress in the assembled lip is such that the inner periphery of the lip is urged axially away from the journal means 21 against the outermost groove wall 54 and reacts on the outermost groove wall 54 to urge the cantilevering portion 73 of the seal 32 toward the journal means 21. Also, the anchoring lip 50 can be initially dimensioned so that it is slightly stretched upon being assembled into the groove 46. The same applies to the anchoring lip 48 of the seal 30.

The same axial movement of the seal 32 which carries the lip 50 into the groove 46 moves the outer marginal edge of the bridging element 58 into its assembled position where it is encircled by the sealing surface 42 that constrains the outer marginal edge of the sealing element 58 to a diameter somewhat less than the initial diameter of this portion of the bridging element. The physical memory of the seal 32 by which it tends continuously to return to its initial shape produces the desired sealing engagement of the cantilevering portion 73 of the seal with the encircling surface 42.

Preferably, the bridging element 56 of the seal 30, which is typical of the two seals 30, 32, has a thickness equal to a large fraction of the radial distance between the shoulder 52 and the sealing surface 40. Because of this dimensional relationship and the previously mentioned positional relationship of the shoulder or abutment 52 to the sealing surface 40, the inner surface 80 of the seal bridging element 56 is disposed generally, as viewed in axial section, FIG. 2, at a rather small angle in relation to the axis of the bearing.

As a consequence, the force of fluid pressure on the inner surface 80, as represented by the arrows 82 in FIG. 2, has in the aggregate a relatively large component acting radially inward, and only a very much smaller component acting axially outward on the seal 30. The relatively large force of fluid pressure which acts radially inward on the seal 30 urges the anchoring lip 48 radially inward to intensify the retention of the anrchoring lip 48 in the groove 44 where it is anchored behind the shoulder 52. This assures that the seal 30 is securely anchored in the groove 44 against the relatively small force of fluid pressure which may act on the seal in an axially outward direction in the event of a pressure rise in the space 22. A similar seal retaining action is produced by the force of fluid pressure on the inner surface 84 of the seal 32.

It will be appreciated that any build-up of fluid pressure in the space 22 acts on the surfaces 80, 84, to cause the cantilevering annular portions 71, 73 of the respective seals to "bow" or swing radially inward away from the respective surfaces 40, 42, to relieve pressure within the space 22, whereupon the seals again reengage the surfaces 40, 42.

The manner in which the sealing lips 48, 50 are lodged behind the shoulders or abutments 52, 54 on the inner race element 14 provides for effective retention of the seals in place even though foliage or other stringy material may become wrapped in close proximity to the seals, as an incident to rotation of the race elements 14, 16 in relation to each other in service.

It will be appreciated that the structural relationship of the seals 30, 32 to the supporting inner race 14 described provides for easy assembly of the seals 30, 32 in the manner described with only limited stretching of the seals as an incident to assembly of the seals, while at the same time providing for secure retention of the seals in the bearing in the manner described.

In the present instance, the bearing 10 is shaped to cooperate with an eccentric annular retaining element 88 which holds the inner race 14 against rotation on a shaft element (not shown).

In the present instance, the seal 32 is further protected by means of an annular shield 90 shaped as shown in FIG. 2 to have a generally U-shape in transverse section.

The shield 90 is secured to the inner race element 14 in a manner which assures a concentric relationship of the shield 90 to the inner race element, while at the same time providing for efficient, economical assembly of the shield and inner race element in relation to each other.

The shield 90 comprises a flat annular body 92 which extends radially outward across the seal 32, as shown in FIG. 2, and which is secured to the inner race element 14 by an annular lip or flange 94 on the inner marginal edge of the shield, which is spun over into tight engagement with an inwardly facing ledge or shoulder surface 96 formed in the adjacent end of the race element 14 by a counterbore 98 in the race element 14. The counterbore 98 is enlarged somewhat near its inner extremity so that the diameter of the ledge surface 96 increases in an axially inward direction. Moreover, the minimum radius of the surface 96 is made to exceed the radius of the bore 100 in the race element 14 to a dimensional degree exceeding the thickness of the shield lip 94, to assure radial clearance between the shield lip 94 and a shaft (not shown), fitting through the inner bearing bore 100.

Thus, the simple spinning operation causing the shield lip 94 to tightly engage the ledge surface 96 assures automatically a concentric relationship between the shield and the bearing and a strong attachment of the shield to the bearing. As shown, an outer lip or ledge 102 on the shield 90 extends toward the outer race element 16 to provide further protection to the bearing from the external environment.

It should be noted with reference to FIG. 2 that the lubricating fitting 34 is offset laterally in the outer race element 16 so that the shaping of the outer race element to accommodate the fitting 34 does not restrict at the inner end of the fitting 34 the width of the outer race 20 along which the balls 12 roll.

The invention is claimed as follows:

1. A sealed bearing comprising, in combination, an inner bearing element defining an inner annular race, an outer bearing element encircling said inner bearing element and defining an outer annular race encircling said inner race, an annular series of rotary load bearing members intervening between said races in rolling engagement therewith to journal said inner and outer elements for relative rotation about a common axis, said outer bearing element defining an annular sealing surface located axially at one side of said outer race and facing generally in a radially inward direction in concentric relation to said axis, a flexible annular seal formed of yieldable polymeric material and encircling said inner bearing element between said inner and outer bearing elements, said flexible seal including a cantilevering annular portion which cantilevers radially away from said inner bearing element and axially away from said inner race, said cantilevering annular portion of said seal having an axially extending marginal edge which is encircled by said sealing surface, said seal being twisted out of its unstressed shape and thereby having a residual stress which continuously urges said cantilevering annular portion of the seal radially outward against said sealing surface so that the seal slidably engages said sealing surface over an annular band of mutual contact having substantial width, said seal including an annular support portion integral with said cantilevering portion and closely encircling said inner bearing element axially inward of said band of mutual engagement to support the seal on the inner bearing element, said seal support portion being shaped to define an annular seal anchoring lip which projects laterally sharply in relation to the adjacent portion of said cantilevering annular portion of the seal and which projects radially inward in relation to said inner bearing element, said inner bearing element defining therein an annular seal anchoring groove concentric with said common axis and opening radially outward between two radial and generally parallel groove walls formed on the inner bearing element, said seal anchoring lip extending radially inward into said groove to anchor the seal against axially outward displacement; said anchoring lip, as disposed in said groove, being twisted out of its unstressed shape and having a residual stress tending to twist the lip against the restraint of said groove walls so that the lip is continuously urged by the residual stress therein into effective sealing engagement with the groove walls, said residual stress in the lip tending to twist the lip rotatably in a direction such that the radially inner periphery of the lip is urged axially away from said inner race and against the outermost groove wall which is on the side of the groove nearer said band of mutual engagement so that the residual stress in the anchoring lip reacts on said outermost groove wall to urge said cantilevering portion of the seal toward said rotary load bearing members; said inner bearing element being shaped and dimensioned in relation to said sealing surface and said seal to provide, when the cantilevering portion of the seal is in engagement with said sealing surface, a radial clearance space of annular form disposed on the radially inward side of the seal and having an axial extent running axially entirely across said band of mutual engagement and extending a substantial distance axially from said band of mutual engagement toward said groove; said groove being spaced axially a substantial axial distance from the inner edge of said band of mutual engagement inwardly toward said inner bearing race so that internal fluid pressure acts radially inward on the seal between said band of mutual engagement and said groove to apply to said anchoring lip radially inward force which increases the degree of anchoring the lip in said groove and which swings the cantilevering annular portion of the seal inwardly away from the sealing surface for relieving the internal fluid pressure by passing fluid outwardly between the sealing surface and seal; and said seal being mechanically supported, for engagement with said sealing surface, solely by component integral structure of said inner bearing element that has a permanently fixed and immovable relationship to the portion of said inner bearing element extending between said groove and said journal means.

2. A sealed bearing according to claim 1 in which said outer bearing element and said inner bearing element are shaped and dimensioned in relation to each other to define therebetween an annular seal accommodating space containing said seal and opening axially outward from said load bearing members; said seal accommodating space having a minimum radial dimension that exceeds the minimum lateral dimension of every portion of said seal, as viewed in radial section, so that the seal is movable axially inward between said inner and outer bearing elements and around the portion of said inner bearing element axially outward of said groove to bring said seal anchoring lip into its assembled position in which it extends radially into said groove.

3. A sealed bearing according to claim 1 in which said outermost groove wall is spaced axially inward from said band of mutual engagement by an axial distance that is at least equal to the spacing, measured in a radial direction, of the outer periphery of said outermost groove wall from the inner edge of said band of mutual engagement so that internal fluid pressure acting on said seal between said band of mutual engagement and said groove exerts on the seal a force having a radially inward component that is at least equal to its axially outward component.

4. A sealed bearing comprising, in combination, an inner bearing element, an outer bearing element encircling said inner bearing element, journal means on said inner and outer bearing elements mutually journalling said inner and outer elements for relative rotation about a common axis, said outer bearing element defining an annular sealing surface located axially at one side of said journal means and facing generally in a radially inward direction in concentric relation to said axis, a flexible annular seal formed of yieldable polymeric material and encircling said inner bearing element between said inner and outer bearing elements, said flexible seal including a cantilevering annular portion which cantilevers radially away from said inner bearing element and axially from said journal means, said cantilevering annular portion of said seal having an axially extending marginal edge which is encircled by said sealing surface and which engages said sealing surface over an annular band of mutual contact having substantial width, said seal including an annular support portion integral with said cantilevering portion and closely encircling said inner bearing element axially inward of said band of mutual engagement to support the seal on the inner bearing element, said seal support portion being shaped to define an annular seal anchoring lip which projects laterally generally at a right angle in relation to the adjacent portion of the seal and which projects radially inward in relation to said inner bearing element, said inner bearing element defining therein an annular seal anchoring groove concentric with said common axis and opening radially outward between two radial and generally parallel groove walls formed on the inner bearing element, said seal anchoring lip extending radially inward into said groove to anchor the seal against axially outward displacement; said inner bearing element being shaped and dimensioned in relation to said sealing surface and said seal to provide, when the cantilevering portion of the seal is in engagement with said sealing surface, a radial clearance space of annular form disposed on the radially inward side of the seal and having an axial extent running axially entirely across said band of mutual engagement and extending a substantial distance axially from said band of mutual engagement toward said grooves; said seal bearing twisted out of its unstressed shape and thereby having a residual stress which continuously urges said anchoring lip into firm sealing engagement with said groove and which continuously urges said cantilevering annular portion of the seal radially outward to yieldably hold said marginal edge of the seal in firm sealing engagement with said sealing surface, said groove being spaced axially a substantial axial distance from the inner edge of said band of mutual engagement toward said journal means so that internal fluid pressure acts radially inward on the seal between said band of mutual engagement and said groove to apply to said anchoring lip radially inward force which increases the degree of anchoring the lip in said groove and to swing the cantilevering annular portion of the seal inwardly away from the sealing surface for relieving the internal fluid pressure by passing fluid outwardly between the sealing surface and seal; and said seal being mechanically supported, for engagement with said sealing surface, solely by component integral structure of said inner bearing element that has a permanently fixed and immovable relationship to the portion of said inner bearing element extending between said groove and said journal means.

5. A sealed bearing according to claim 4 in which said outer bearing element and said inner bearing element are shaped and dimensioned in relation to each other to define therebetween an annular seal accommodating space containing said seal and opening axially outward from said journal means; said seal accommodating space having a minimum radial dimension that exceeds the minimum lateral dimension of every portion of said seal, as viewed in radial section, so that the seal is movable axially inward between said inner and outer bearing elements and around the portion of said inner bearing element axially outward of said groove to bring said seal anchoring lip into its assembled position in which it extends radially into said groove.

6. A sealed bearing according to claim 4 in which the groove wall on the outermost side of the groove, with respect to the journal means, is spaced axially inward from said band of mutual engagement by an axial distance that is at least equal to the spacing, measured in a radial direction, of the outer periphery of said outermost groove wall from the inner edge of said band of mutual engagement so that internal fluid pressure acting on said seal between said band of mutual engagement and said groove exerts on the seal a force having a radially inward component that is at least equal to its axially outward component.

References Cited

UNITED STATES PATENTS

| | | | |
|---|---|---|---|
| 1,884,965 | 10/1932 | Baggett | 308—8.2 |
| 2,478,619 | 8/1949 | Wightman | 277—95 X |
| 2,823,553 | 2/1958 | Harrington | 308—187.2 X |
| 2,823,965 | 2/1958 | Harrington | 308—187.1 |
| 2,823,967 | 2/1958 | Harrington | 308—187.2 |
| 2,991,514 | 7/1961 | Cotchett | 308—187.1 |
| 3,142,520 | 7/1964 | Mueller | 308—187.2 |

FOREIGN PATENTS

| | | |
|---|---|---|
| 1,135,636 | 3/1957 | France. |
| 1,264,632 | 12/1961 | France. |

MARTIN P. SCHWADRON, *Primary Examiner.*

L. L. JOHNSON, *Assistant Examiner.*